US012770939B2

(12) United States Patent
Kim et al.

(10) Patent No.: US 12,770,939 B2
(45) Date of Patent: Oct. 20, 2026

(54) BATTERY CELL INSPECTION SYSTEM AND METHOD

(71) Applicant: LG Energy Solution, Ltd., Seoul (KR)

(72) Inventors: Tae Hee Kim, Daejeon (KR); Ha Yong Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 218 days.

(21) Appl. No.: 18/722,023

(22) PCT Filed: Dec. 21, 2022

(86) PCT No.: PCT/KR2022/020970
§ 371 (c)(1),
(2) Date: Jun. 20, 2024

(87) PCT Pub. No.: WO2023/121299
PCT Pub. Date: Jun. 29, 2023

(65) Prior Publication Data

US 2026/0011796 A1 Jan. 8, 2026

(30) Foreign Application Priority Data

Dec. 22, 2021 (KR) ........................ 10-2021-0185151

(51) Int. Cl.
*H01M 10/42* (2006.01)
*G06T 7/00* (2017.01)
*G06T 7/73* (2017.01)

(52) U.S. Cl.
CPC ....... *H01M 10/4285* (2013.01); *G06T 7/0006* (2013.01); *G06T 7/0008* (2013.01);
(Continued)

(58) Field of Classification Search
None
See application file for complete search history.

(56) References Cited

U.S. PATENT DOCUMENTS 8,596,866 B2 12/2013 Matoba
2019/0340747 A1* 11/2019 Wang .................. H01M 8/2404
(Continued)

FOREIGN PATENT DOCUMENTS

CN 109916927 A 6/2019
CN 111398287 A 7/2020
(Continued)

OTHER PUBLICATIONS

Search report from International Application No. PCT/KR2022/020970, mailed Mar. 23, 2023, 2 pages.
(Continued)

*Primary Examiner* — Vikkram Bali
(74) *Attorney, Agent, or Firm* — Lerner David LLP

(57) ABSTRACT

A battery cell inspection system includes a photographing unit configured to obtain an electrode image of a battery cell, a memory storing a learning model trained to track an electrode endpoint in an electrode image of a battery cell, and a controller. The controller is configured to track the electrode endpoint in the electrode image of the battery cell by using the learning model, and to determine whether an electrode of the battery cell is defective, based on coordinate information of the electrode endpoint. A battery cell inspection method is also provided.

12 Claims, 8 Drawing Sheets

(52) U.S. Cl.
CPC ...... *G06T 7/75* (2017.01); *G06T 2207/10081* (2013.01); *G06T 2207/10116* (2013.01); *G06T 2207/20081* (2013.01); *G06T 2207/20084* (2013.01)

(56) References Cited

U.S. PATENT DOCUMENTS

| | | | | |
|---|---|---|---|---|
| 2019/0341658 | A1 | 11/2019 | Han et al. | |
| 2020/0350637 | A1 | 11/2020 | You et al. | |
| 2023/0074096 | A1* | 3/2023 | Oh | G06T 7/0006 |
| 2023/0109910 | A1* | 4/2023 | Bruder | B60L 3/12 702/63 |

FOREIGN PATENT DOCUMENTS

| | | | |
|---|---|---|---|
| CN | 112258459 | A | 1/2021 |
| CN | 113129260 | A | 7/2021 |
| KR | 20160067024 | A | 6/2016 |
| KR | 102014050 | B1 | 8/2019 |
| KR | 20190126524 | A | 11/2019 |
| KR | 20190128111 | A | 11/2019 |
| KR | 102206908 | B1 | 1/2021 |
| KR | 20210106038 | A | 8/2021 |
| KR | 102312730 | B1 | 10/2021 |

OTHER PUBLICATIONS

Pietsch P. et al., "X-Ray Tomography for Lithium Ion Battery Research: A Practical Guide" Annual Review of Materials Research, Apr. 2017, pp. 451-479, vol. 47.

Extended European Search Report including Written Opinion for Application No. 22911932.6 dated Jan. 24, 2025, pp. 1-8.

* cited by examiner

BATTERY CELL INSPECTION SYSTEM AND METHOD

CROSS-REFERENCE TO RELATED APPLICATIONS

This present application is a national phase entry under 35 U.S.C § 371 of International Application No. PCT/KR2022/020970 filed on Dec. 21, 2022 which claims the benefit of priority based on Korean Patent Application No. 10-2021-0185151 filed in the Korean Intellectual Property Office on Dec. 22, 2021, all contents of which are incorporated herein by reference.

TECHNICAL FIELD

Embodiments disclosed herein relate to a battery cell inspection system and method.

BACKGROUND ART

With the recent rapid development of electrical, electronics, communication, and computer industries, the demand for high-performance and high-safety batteries is gradually increasing. A lithium polymer battery, a type of secondary batteries, is a battery capable of repeating charge and discharge through reversible interconversion between chemical energy and electrical energy, and has been used variously for portable electronic devices, electric vehicle batteries, etc., due to the advantages of long life and large capacity.

Generally, an electrode assembly of a lithium polymer battery has a structure in which a plurality of positive electrodes and negative electrodes are alternately stacked with separators therebetween. To prevent the precipitation of lithium, the negative electrode may have a large area enough to cover the positive electrode, in which a protruding portion of the negative electrode is referred to as an overhang. When an overhang portion is bent or protrudes too much, or some electrode is missing due to a problem in a manufacturing process, it may lead to a defect of a battery and thus require a process of inspecting an electrode through internal CT scan. However, in an existing battery cell inspection system, an inspector observes an image of an inspection object with the naked eyes to determine a defect, making it difficult to perform total inspection due to a long time taken and resulting in a limitation in reducing a defect rate merely with sampling inspection.

DISCLOSURE

Technical Problem

Embodiments disclosed herein aim to a battery cell inspection system and method in which an electrode endpoint is tracked in a battery cell image using an artificial intelligence learning model and it is automatically determined based thereon whether an electrode is defective.

Technical problems of the embodiments disclosed herein are not limited to the above-described technical problems, and other unmentioned technical problems would be clearly understood by one of ordinary skill in the art from the following description.

Technical Solution

A battery cell inspection system according to an embodiment includes a photographing unit configured to obtain an electrode image of a battery cell, a memory device storing a learning model trained to track an electrode endpoint in an electrode image of a battery cell, and a controller configured to track the electrode endpoint in the electrode image of the battery cell by using the learning model, and determine whether an electrode of the battery cell is defective, based on coordinate information of the electrode endpoint.

In the battery cell inspection system according to an embodiment, the learning model may be generated by receiving learning data including an electrode image of a battery cell, labelling the learning data, extracting a feature based on the labelled learning data, and developing a database where the feature is recorded.

In the battery cell inspection system according to an embodiment, the photographing unit may include a radiation source configured to output radiation toward a region of interest of the battery cell and a radiation detector configured to detect radiation penetrating the region of interest of the battery cell.

In the battery cell inspection system according to an embodiment, the photographing unit may be further configured to obtain a three-dimensional image for the region of interest of the battery cell, and the controller may be further configured to generate cross-sectional images for two or more directions based on the three-dimensional image and track an electrode endpoint of the battery cell for each of the cross-sectional images, and the learning model may be trained using cross-sectional images for two or more directions, generated based on a three-dimensional image, as learning data.

In the battery cell inspection system according to an embodiment, an electrode of the battery cell may include a structure where a plurality of positive electrodes and a plurality of negative electrodes are alternately stacked with separators therebetween, and the controller may be further configured to determine that the electrode of the battery cell is defective, in at least one of a case where some positive electrode or negative electrode is bent, a case where some positive electrode or negative electrode is missing, a case where a gap between endpoints of adjacent positive electrode and negative electrode is equal to or greater than a reference value, a case where an insertion order of a positive electrode or a negative electrode is reversed, a case where a gap between endpoints of adjacent positive electrodes or a gap between endpoints of adjacent negative electrodes is equal to or greater than a reference value, a case where a parameter indicating an alignment state of a positive electrode and a negative electrode in a specific section is equal to or less than a reference value, and a case where some positive electrode or negative electrode is disconnected.

The battery cell inspection system according to an embodiment may further include a tray on which two or more battery cells are loaded and a transferring unit configured to transfer the tray on which the battery cells are loaded, to a photographing point of the photographing unit, and transfer the tray out of the photographing point upon completion of photographing.

In the battery cell inspection system according to an embodiment, the transferring unit may be further configured to simultaneously transfer two or more trays on which the battery cells are loaded, to the photographing point, and the two or more trays may be arranged such that the radiation output from the radiation source penetrates regions of interest of the battery cells loaded on all of the trays at the same time.

In the battery cell inspection system according to an embodiment, the two or more trays may be arranged such that corners of the battery cells loaded on each tray face corners of the battery cells loaded on another tray, in the photographing point.

In the battery cell inspection system according to an embodiment, the transferring unit may be further configured to rotate the tray on which the battery cells are loaded, with respect to an axis in the photographing point, and the photographing unit may be further configured to obtain a three-dimensional image of the battery cell based on a two-dimensional radiation image obtained during rotation of the tray.

A battery cell inspection method according to an embodiment may include training a learning model to track an electrode endpoint in an electrode image of a battery cell, obtaining the electrode image of the battery cell, tracking the electrode endpoint in the electrode image of the battery cell by using the learning model, and determining whether an electrode of the battery cell is defective, based on coordinate information of the electrode endpoint.

In the battery cell inspection method according to an embodiment, the learning model may be generated by receiving learning data including an electrode image of a battery cell, labelling the learning data, extracting a feature based on the labelled learning data, and developing a database where the feature is recorded.

In the battery cell inspection method according to an embodiment, the obtaining of the electrode image of the battery cell may include outputting radiation toward a region of interest of the battery cell and detecting radiation penetrating the region of interest of the battery cell.

In the battery cell inspection method according to an embodiment, the obtaining of the electrode image of the battery cell may include obtaining a three-dimensional image for the region of interest of the battery cell, and the tracking of the electrode endpoint of the battery cell may include generating cross-sectional images for two or more directions based on the three-dimensional image and tracking the electrode endpoint of the battery cell for each of the cross-sectional images, and the learning model may be trained using cross-sectional images for two or more directions, generated based on a three-dimensional image, as learning data.

In the battery cell inspection method according to an embodiment, an electrode of the battery cell may include a structure where a plurality of positive electrodes and a plurality of negative electrodes are alternately stacked with a separator therebetween, and the battery cell inspection method may further include determining that the electrode of the battery cell is defective, in at least one of a case where some positive electrode or negative electrode is bent, a case where some positive electrode or negative electrode is missing, a case where a gap between endpoints of adjacent positive electrode and negative electrode is equal to or greater than a reference value, a case where an insertion order of a positive electrode or a negative electrode is reversed, a case where a gap between endpoints of adjacent positive electrodes or a gap between endpoints of adjacent negative electrodes is equal to or greater than a reference value, a case where a parameter indicating an alignment state of a positive electrode and a negative electrode in a specific section is equal to or less than a reference value, and a case where some positive electrode or negative electrode is disconnected.

The battery cell inspection method may further include loading two or more battery cells on a tray, transferring the tray on which the battery cells are loaded, to a photographing point, and transferring the tray out of the photographing point upon completion of photographing.

In the battery cell inspection method according to an embodiment, the transferring of the tray to the photographing point may include simultaneously transferring two or more trays on which the battery cells are loaded, to the photographing point, and the two or more trays may be arranged such that the radiation penetrates regions of interest of the battery cells loaded on all of the trays at the same time.

In the battery cell inspection method according to an embodiment, the two or more trays may be arranged such that corners of the battery cells loaded on each tray face corners of the battery cells loaded on another tray, in the photographing point.

The battery cell inspection method according to an embodiment may further include rotating the tray on which the battery cells are loaded, with respect to an axis in the photographing point, in which the obtaining of the electrode image of the battery cell may include obtaining a three-dimensional image of the battery cell based on a two-dimensional radiation image obtained during rotation of the tray.

Advantageous Effects

Embodiments disclosed herein aim to describe a battery cell inspection system and method in which an electrode endpoint may be tracked in a battery cell image using an artificial intelligence learning model and a defect of an electrode may be automatically determined based on the tracked electrode endpoint.

According to the proposed system and method, by simultaneously obtaining electrode images of several stacked battery cells and automatically inspecting an electrode of each battery cell by using a learning model, a time required for inspection may be largely reduced. Thus, unlike existing sampling inspection, total inspection may be possible and thus a risk corresponding to a defect of a product may be greatly reduced.

Moreover, various effects recognized directly or indirectly from the disclosure may be provided.

DESCRIPTION OF DRAWINGS

In order to more clearly describe technical solutions of embodiments disclosed herein or the prior art, the drawings required in the description of the embodiments are briefly introduced below. It should be understood that the following drawings are for the purpose of explaining the embodiments of the present specification and not for limiting purposes. In addition, representations of some components in the drawings may be exaggerated or omitted for clarity of explanation.

DETAILED DESCRIPTION

Figure 1:
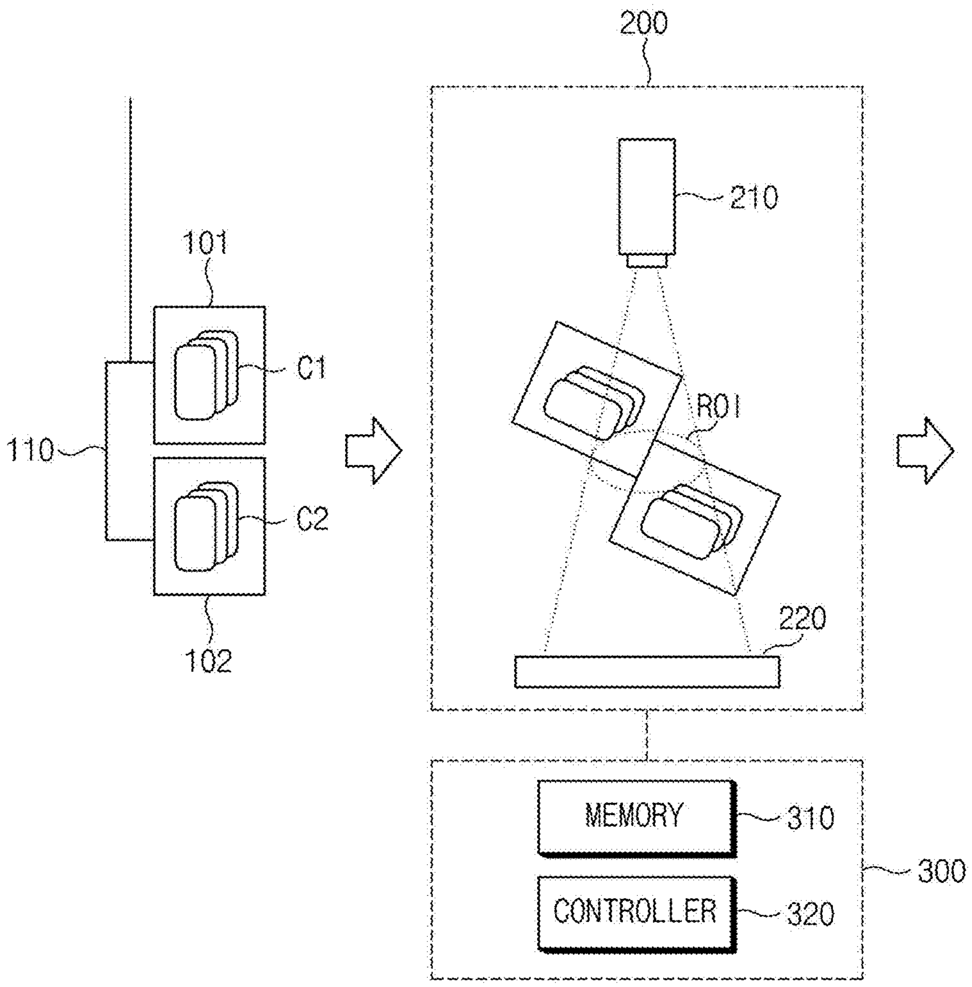
FIG. 1 shows a configuring and operating process of a battery cell inspection system according to an embodiment.

Hereinafter, embodiments disclosed in this document will be described in detail with reference to the exemplary drawings. In adding reference numerals to components of each drawing, it should be noted that the same components are given the same reference numerals even though they are indicated in different drawings. In addition, in describing the embodiments disclosed in this document, when it is determined that a detailed description of a related known configuration or function interferes with the understanding of an embodiment disclosed in this document, the detailed description thereof will be omitted.

Although terms used herein are selected with general terms popularly used at present under the consideration of functions in the disclosure, the terms may vary according to the intention of those of ordinary skill in the art, custom, or introduction of new technology. In addition, in a specific case, the applicant voluntarily may select terms, and in this case, the meaning of the terms may be disclosed in a corresponding description part of the present specification. Therefore, the terms used herein should be defined not by the simple names of the terms but by the substantial meaning of the terms and the contents throughout the disclosure. Moreover, terms defined in the present disclosure are used for only describing a specific exemplary embodiment and may not have an intention to limit the scope of other exemplary embodiments. It is to be understood that the singular forms include plural references unless the context clearly dictates otherwise.

FIG. 1 shows a configuring and operating process of a battery cell inspection system according to an embodiment. Referring to FIG. 1, a battery cell inspection system according to an embodiment may include trays 101 and 102 having two or more battery cells C1 and C2 loaded thereon, a transferring unit 110 for transferring the trays 101 and 102, a photographing unit 200 for obtaining electrode images of the battery cells C1 and C2, and an inspection unit 300 for tracking electrode endpoints of the battery cells C1 and C2 and determining whether electrodes are defective based thereon.

A battery cell is a minimum unit constituting a rechargeable secondary battery, and may be manufactured through a process of packaging an electrode assembly, an activating process of activating a battery by charging and discharging the battery having passed through the packaging process, a degassing process of discharging a gas from a battery cell, and a folding process of cutting a part of a pouch and sealing the pouch.

The electrode assembly may be manufactured through a notching process of making positive electrode and negative electrode tabs of the battery, a stacking process of stacking a battery material, and a tab welding process of welding the positive electrode and negative electrode tabs. A general electrode structure has a structure in which a single positive electrode sheet or a plurality of positive electrode sheets where a positive electrode active material is formed on a positive electrode current collector and a single negative electrode sheet or a plurality of negative electrode sheets where a negative electrode active material is formed on a negative electrode current collector are alternately stacked, and the positive electrode sheet and the negative electrode sheet may face each other with a separator sheet therebetween. In this case, to prevent the precipitation of lithium, the negative electrode may have a large area enough to cover the positive electrode, in which when the protruding portion of the negative electrode is bent, a gap with the positive electrode is too large, or some electrode is missing, it may lead to a defect of the battery cell and thus it is determined through a separate inspection process whether the electrode is defective.

The two or more battery cells C1 and C2 may be respectively loaded on the trays 101 and 102. To inspect corner portions of the several battery cells C1 and C2 at the same time, the battery cells may be loaded exactly on top of each other and the trays 101 and 102 may have loading spaces respectively equal to the sizes of the battery cells C1 and C2.

The transferring unit 110 may transfer the trays 101 and 102 loaded on the battery cells C1 and C2 to a photographing point, and upon completion of photographing, transfer the trays 101 and 102 out of the photographing point. According to an embodiment, the transferring unit 110 may transfer the trays 101 and 102 to a designated position after being coupled to engagement potions (not shown) of the trays 101 and 102 through vacuum adsorption (or using a gripper). According to another embodiment, the transferring unit 110 may be a conveyor belt for carrying the trays 101 and 102. In this case, the transferring unit 110 may carry the trays 101 and 102 on a moving stage of the conveyor belt in set speed and direction, without being coupled to the trays 101 and 102.

The photographing unit 200 may photograph regions of interest (ROI) of the battery cells C1 and C2, transferred by the transferring unit 110, to obtain electrode images. Herein, the region of interest may be a corner portion where an electrode of each battery cell is located. According to an embodiment, the photographing unit 200 may include a radiation source 210 that outputs radiation toward a region of interest of the battery cell and a radiation detector 220 that detects radiation having penetrated the region of interest.

The radiation source 210 may be an X-ray tube having a capacity of about 160 to about 240 kV. The X-ray tube may be, for example, a hot-cathode x-ray tube that emits X rays by colliding with a material after creating an electron beam moving at high speed using a heated tungsten filament.

The radiation detector 220 may detect X rays and reconstruct an image by using X-ray information. As shown in FIG. 1, the radiation detector 220 may be located on the opposite side of the radiation source 210 with respect to an inspection target battery cell to detect X rays penetrating the region of interest of the battery cell and reconstruct them as an image.

The battery cells C1 and C2 may be transferred to a photographing point located between the radiation source 210 and the radiation detector 220 (i.e., a position where radiation emitted from the radiation source 210 passes a corner electrode portion of the battery cell). According to an embodiment, to locate the battery cells C1 and C2 at an exact photographing point, the position of the transferring unit 110 coupled to the trays 101 and 102 may be manually or automatically fine-adjusted. According to another embodiment, the positions of the trays 101 and 102 and the transferring unit 110 may be fixed, and the position of the radiation source 210 may be manually or automatically fine-adjusted.

Figure 2:
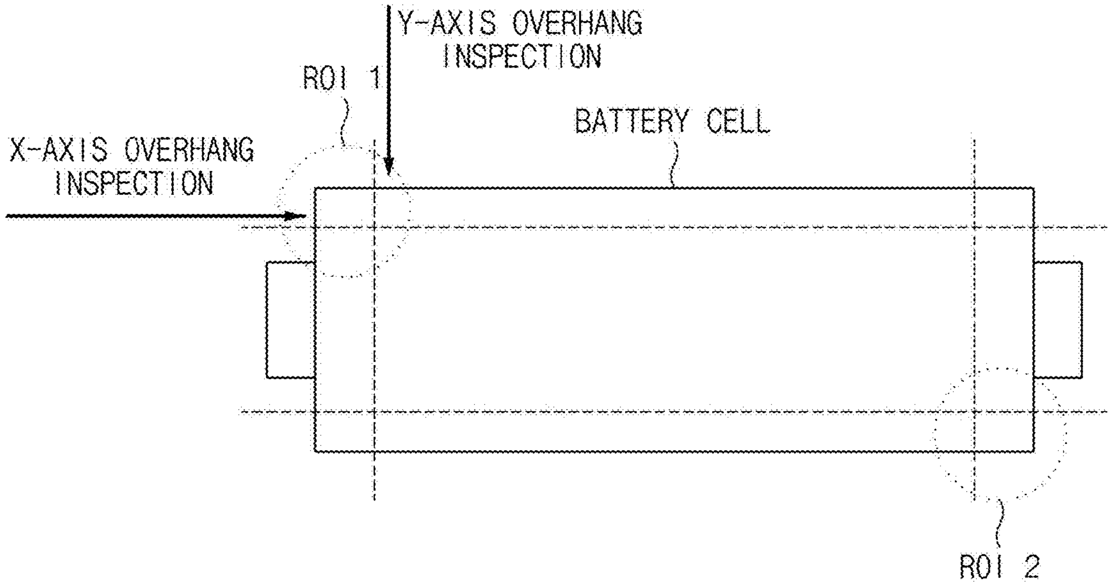
FIG. 2 shows a photographing region-of-interest of a battery cell and an inspection direction along an x axis/y axis, according to an embodiment.

FIG. 2 shows a photographing region of interest of a pouch-type battery cell and an inspection direction along an x axis/y axis, according to an embodiment. For the pouch-type battery cell, an overhang where a negative electrode protrudes relative to a positive electrode is observed in a corner portion, such that the corner portion may be set as regions of interest ROI 1 and ROI 2. Although not shown, for a prismatic battery cell or cylindrical battery cell, another portion where an overhang may be observed may be set as a region of interest to obtain an electrode image.

The electrode images of the battery cells C1 and C2 obtained by the photographing unit 200 may be delivered to the inspection unit 300. Referring to FIG. 1, the inspection unit 300 may include a memory device 310 that stores a learning model trained to track an electrode endpoint in an electrode image of a battery cell and a controller 320 that determines whether an electrode is defective by using the learning model.

The memory device 310 may be various storage media such as a semiconductor memory like random-access memory (RAM), read-only memory (ROM), flash memory, etc., and a magnetic disk, an optical disk, etc. The learning model stored in the memory device 310 is an artificial intelligence machine learning model trained to track an electrode endpoint in an electrode image of a battery cell, and may be, for example, a deep learning model having a multi-layer artificial neural network structure.

A process of generating and training a learning model according to an embodiment is as described below. Learning data including an electrode image of a battery cell may be input, and the learning data may be labelled as a learning base task for tracking an electrode endpoint. Labelling may refer to a process of inputting various information serving purposes to enable artificial intelligence to learn data such as images, video, texts, etc., into each data. Each labelled data may be stored as points to constitute learning data. A feature may be extracted based on the labelled learning data, and a database in which the feature is recorded may be structured to match the feature to a feature of input data, thereby generating a learning model. The learning model may undergo a process of receiving a battery cell electrode image as input data and extracting a feature of each input data for comparison, and matching the extracted feature to a feature of a previously generated database to optimize a shape of an object having a high matching rate.

The controller 320 may track an electrode endpoint in an electrode image of a battery cell by using the learning model stored in the memory device 310 and determine whether an electrode of the battery cell is defective, based on coordinate information of the electrode endpoint. The controller 320 may include a processor that processes data and performs an operation, such as a CPU, an MPU, an MCU, etc.

An example electrode endpoint tracking process using the learning model is as described below. First, a preprocessing process of input image data may be performed. For example, an input image may be converted into a high-quality image by using a deep learning-based high-resolution algorithm. Next, in a shape detection stage, the high-quality image may be segmented to detect endpoints of a negative electrode and a positive electrode. Next, a skeleton model may be extracted from the shape of the endpoint detected through segmentation, and disconnected and connected portions may be post-processed to extract contour information. Through such a series of processes, the controller 320 may track coordinates of the electrode endpoint in the input image and determine whether the electrode is defective, based on the coordinate information.

According to an embodiment, the battery cell inspection system may perform inspection based on a 3D image obtained by photographing the electrode of the battery cell. According to an embodiment, the transferring unit 110 may rotate a tray on which inspection target battery cells are loaded, by 360 degrees with respect to an axis in the photographing point, and the photographing unit 200 may generate a 3D image based on a tomographic image captured during rotation of the tray and the battery cells. A computed tomography (CT) technique may be used as a 3D imaging scheme, in which a tomographic image may be obtained by transmitting X rays while rotating a battery cell, and a 3D image may be obtained by reconstructing multiple tomographic images.

According to an embodiment, the controller 320 may generate cross-sectional images for two or more directions (e.g., an x-axis direction cross-sectional image and a y-axis direction cross-sectional image) based on the 3D image, and track an electrode endpoint for each cross-sectional image by using a learning model. The learning model may be trained by using, as learning data, the cross-sectional images for the two or more directions (e.g., the x-axis direction and the y-axis direction) generated based on a 3D image.

Figure 3A:
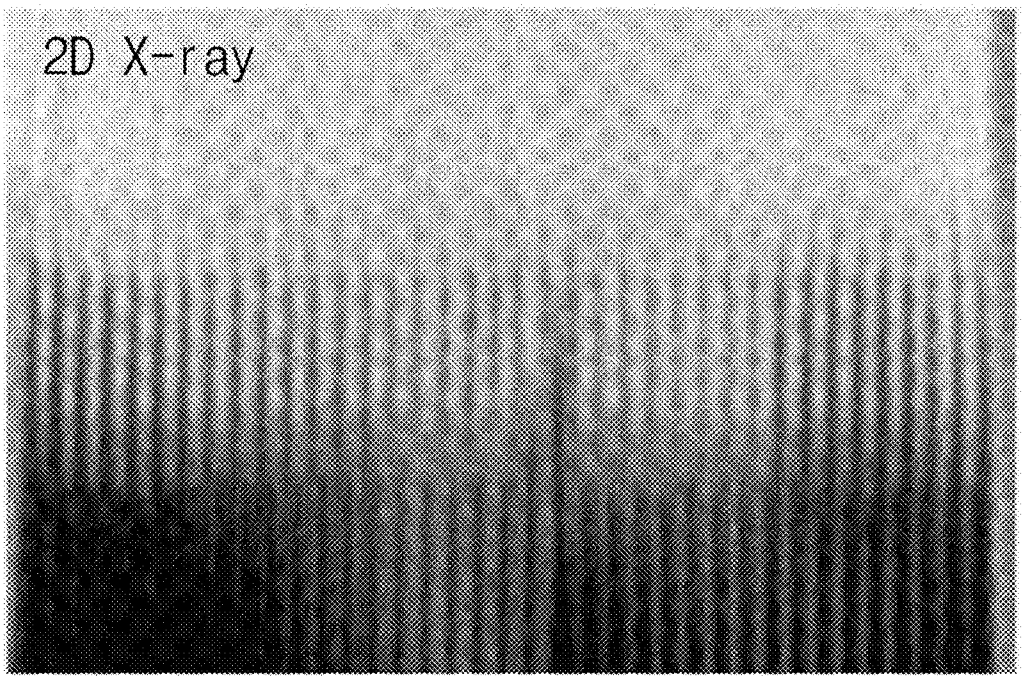
FIG. 3A shows a two-dimensional (2D) image, obtained through X-ray photography, of an internal electrode of a battery cell.
Figure 3B:
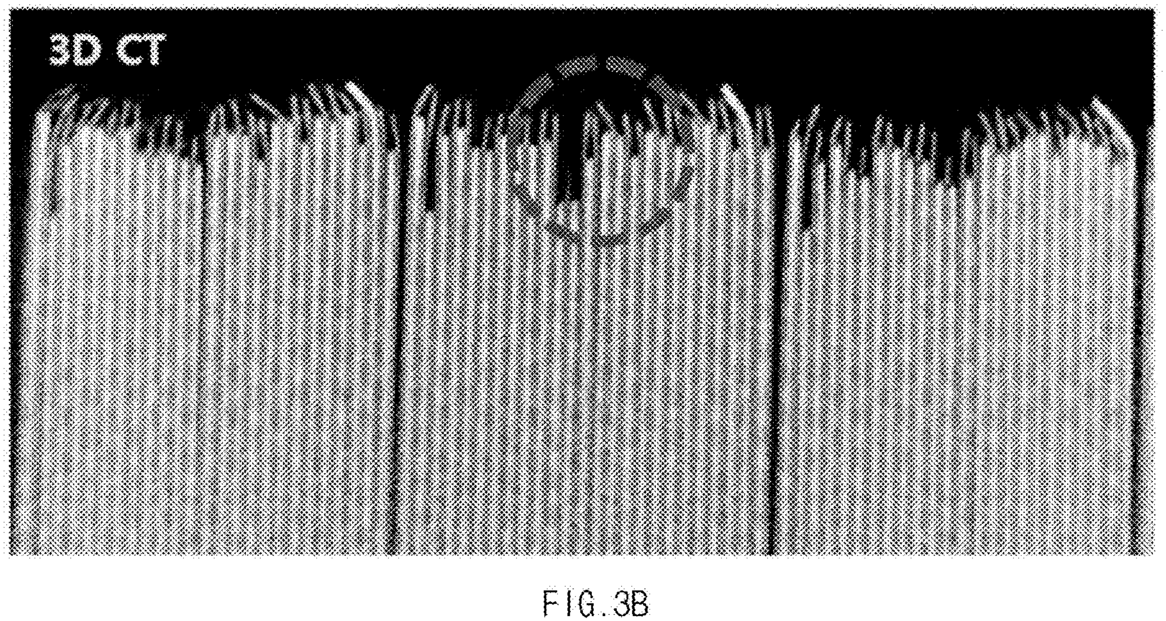
FIG. 3B shows a cross-sectional image generated based on a three-dimensional (3D) image, obtained through X-ray photography, of an internal electrode of a battery cell.

FIG. 3A shows a 2D image of a battery cell internal electrode, obtained through radiography, and FIG. 3B shows a cross-sectional image generated based on a 3D image of a battery cell internal electrode, obtained through radiography. For the 2D image shown in FIG. 3A, the electrode is not clearly distinguished due to low resolution, making it difficult to track the electrode endpoint. On the other hand, by obtaining the 3D image, a high-resolution cross-sectional image may be obtained as shown in FIG. 3B, and the accuracy of endpoint tracking may be improved through cross-sectional inspection for the two or more directions (e.g., the x-axis direction and the y-axis direction).

The controller 320 may determine whether an electrode is defective, by using electrode tracking coordinates. According to an embodiment, in at least one of a case where some positive electrode or negative electrode is bent, a case where some positive electrode or negative electrode is missing, a case where a gap between endpoints of adjacent positive electrode and negative electrode is equal to or greater than a reference value, a case where an insertion order of a positive electrode or a negative electrode is reversed, a case where a gap between endpoints of adjacent positive electrodes or a gap between endpoints of adjacent negative electrodes is equal to or greater than a reference value, a case where a parameter indicating an alignment state of a positive electrode and a negative electrode in a specific section is equal to or less than a reference value, and a case where some positive electrode or negative electrode is disconnected, the controller 320 may determine that an electrode of the battery cell is defective.

FIGS. 4A to 4G are schematic diagrams of an electrode cross-sectional image of a battery cell, respectively showing cases where an electrode may be determined to be defective.

Figure 4A:
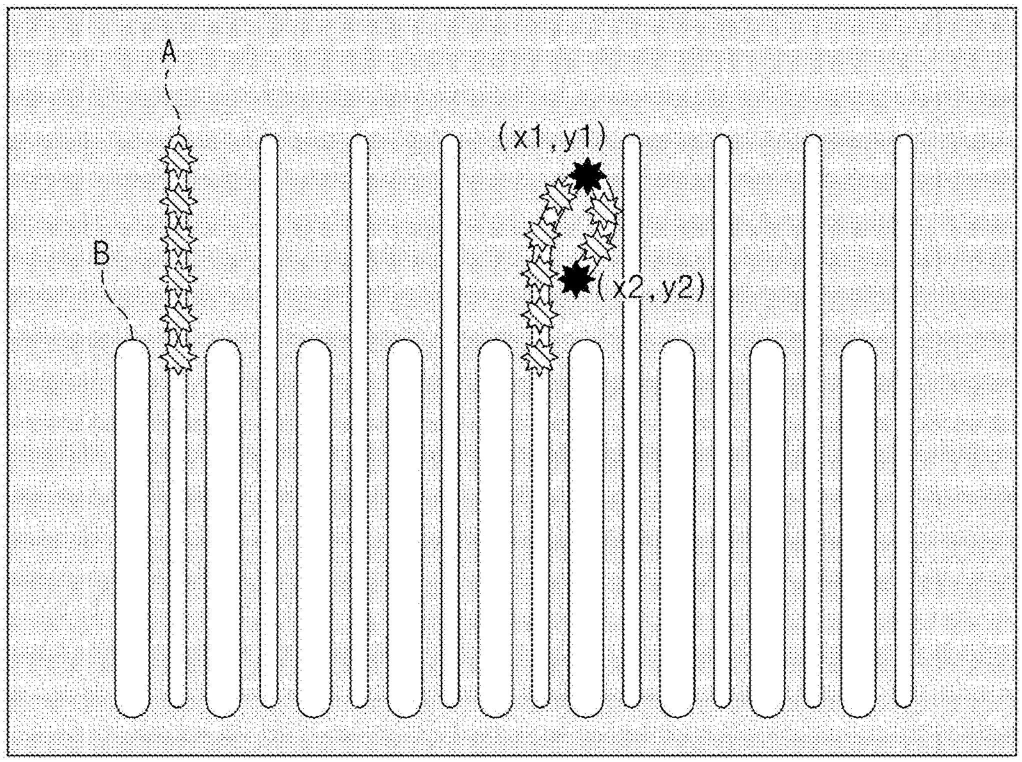
FIGS. 4A to 4G illustrate a case where each battery cell electrode is determined to be defective.

FIG. 4A shows a case where some negative electrode A is bent in an electrode structure where the negative electrode A and a positive electrode B are alternately stacked. The controller 320 may track endpoint coordinates (x1, y1) and (x2, y2) of a negative electrode by using a learning model, and calculate how much the negative electrode A is bent, based on coordinate information. For example, when endpoint coordinates of a negative electrode satisfy the following equation, it may be determined that excessive deformation occurs in the negative electrode. Herein, reference values $X_{ref}$ and $Y_{ref}$ for determining a defect may be set arbitrarily.

$$|x1-x2|>X_{ref} \text{ or } |y1-y2|>Y_{ref} \quad \text{Equation (1)}$$

Alternatively, when tracked points along a negative electrode are sequentially aligned for each position, a negative electrode may be estimated as being bent for the greatest value y of intermediate coordinates. As such, when the negative electrode is bent, a circuit may be short-circuited due to contact with another electrode, such that the corresponding battery cell may be determined to be defective.

Figure 4B:
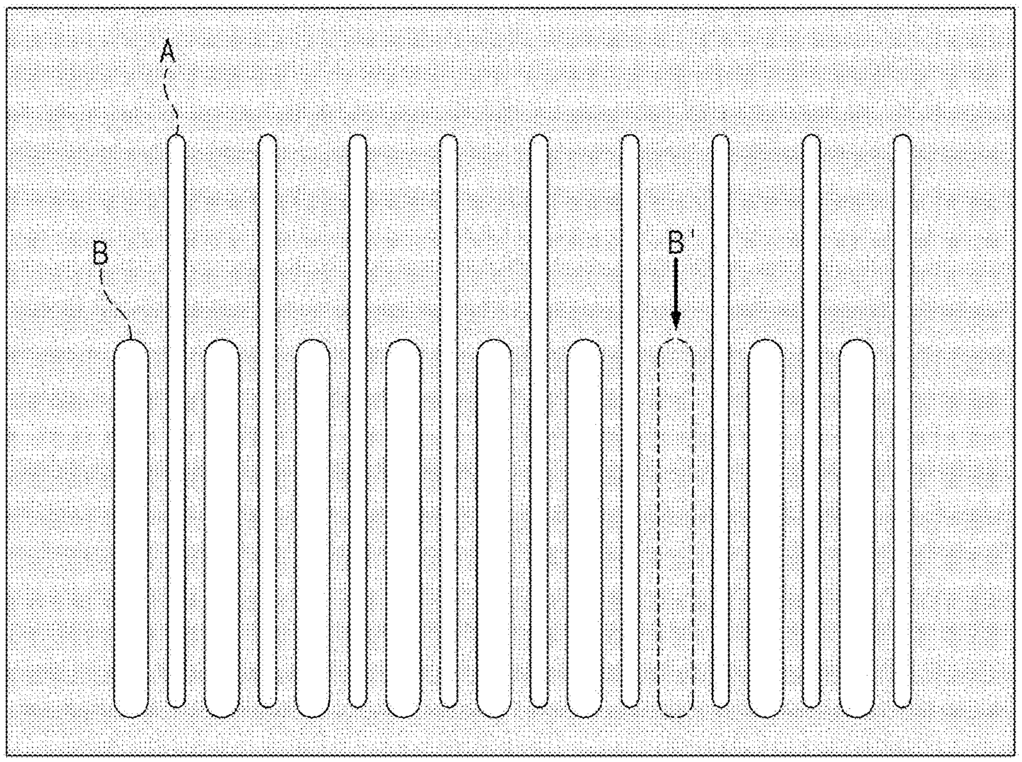

FIG. 4B shows a case where some positive electrode B' is missing in an electrode structure where the negative electrode A and the positive electrode B are alternately stacked. The controller 320 may inspect the number of positive electrode and negative electrode stacks by tracking an electrode endpoint, in which when the inspected number of stacks is not equal to a designated number, the controller 320 may determine that some electrode is missing. In this case, the circuit may be short-circuited due to contact between negative electrodes or positive electrodes, such that the controller 320 may determine that the corresponding battery cell is defective.

Figure 4C:
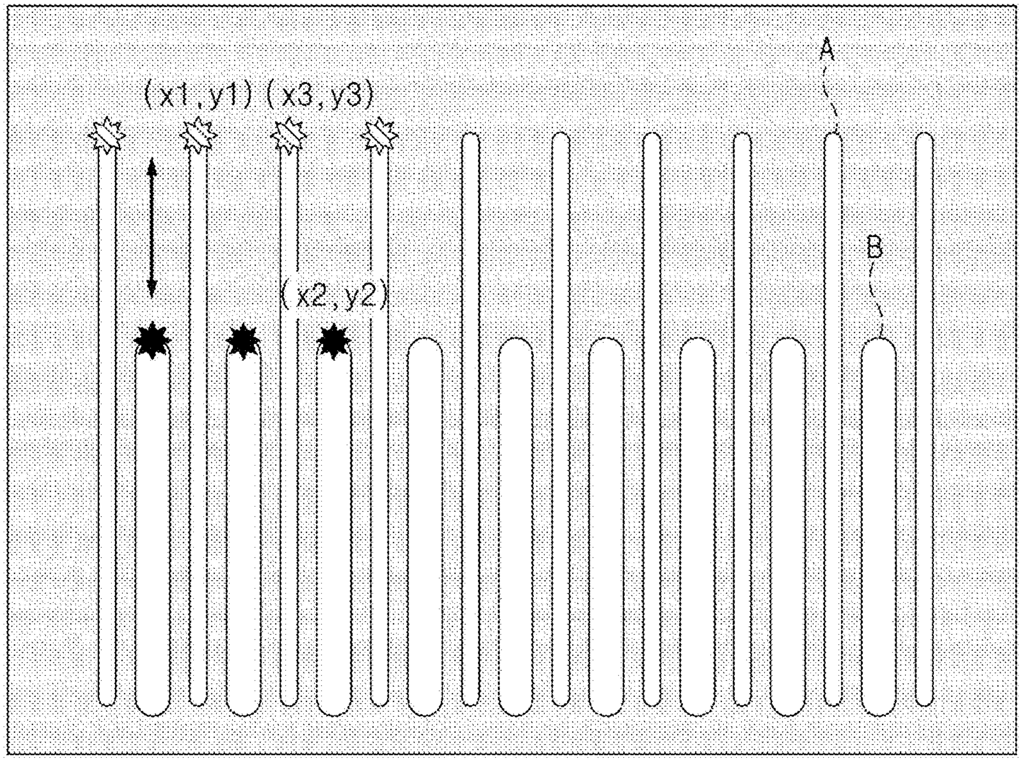

FIG. 4C shows a case where a gap between endpoints of the adjacent negative electrode A and positive electrode B is equal to or greater than a reference value in an electrode structure where the negative electrode A and the positive electrode B are alternately stacked. The controller 320 may track negative electrode endpoint coordinates (x1, y1) and (x3, y3) and positive electrode endpoint coordinates (x2, y2) by using the learning model, and measure a size of a gap between electrodes based on coordinate information. When the size of the gap is equal to or greater than a reference value, a circuit is likely to be short-circuited due to bending of an electrode and contact between electrodes, such that the controller 320 may determine that the corresponding battery cell is defective.

Figure 4D:
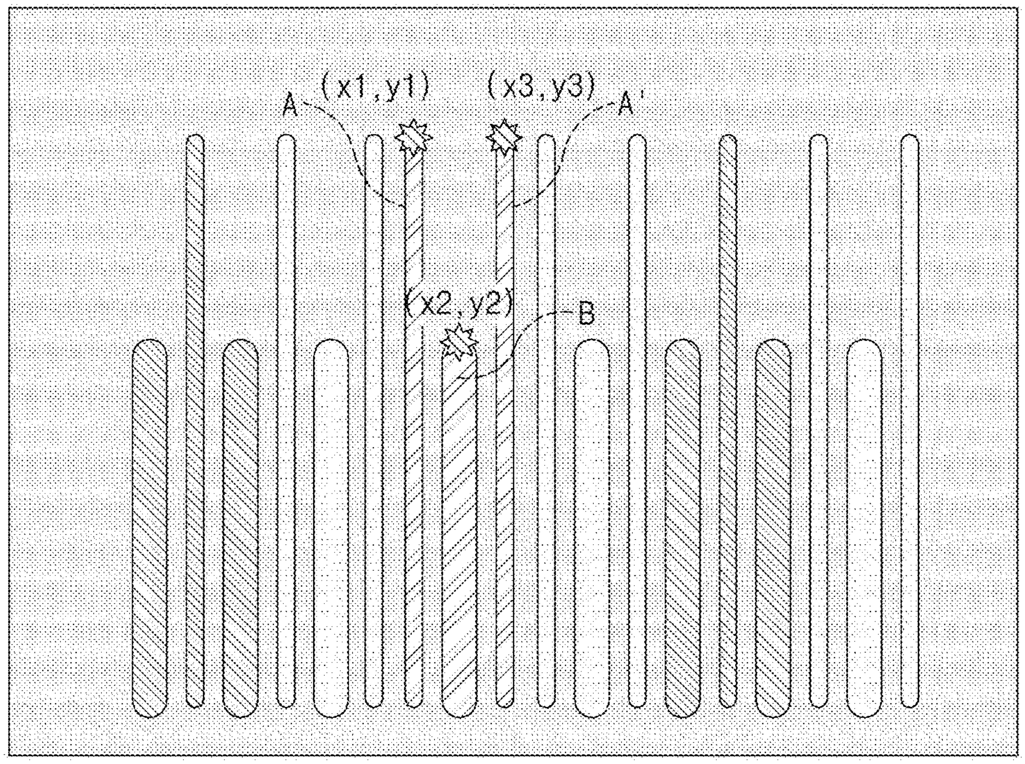

FIG. 4D shows a case where an insertion order of a positive electrode or a negative electrode is reversed in a structure where a negative electrode and a positive electrode are stacked alternately. Positive electrodes have to be inserted at positions A and A' and negative electrodes have to be inserted at a position B in a normal case, but when a negative electrode is inserted in place of a positive electrode and a positive electrode is inserted in place of a negative electrode as shown in FIG. 4D, a corresponding battery cell may be determined to be defective. For example, the controller 320 may track endpoint coordinates (x1, y1), (x2, y2), and (x3, y3) of three consecutive electrodes according to a Bi-cell sequence, compare heights (y1, y2, y3) of the respective end points, and determine that a corresponding cell is defective due to fault insertion of the Bi-cell when y1 and y3 are higher than y2. Alternatively, as a result of tracking a height of each electrode, when high electrodes are consecutive or low electrodes are consecutive without repetition of the high electrodes and the low electrodes, a corresponding cell may be determined to be defective.

Figure 4E:
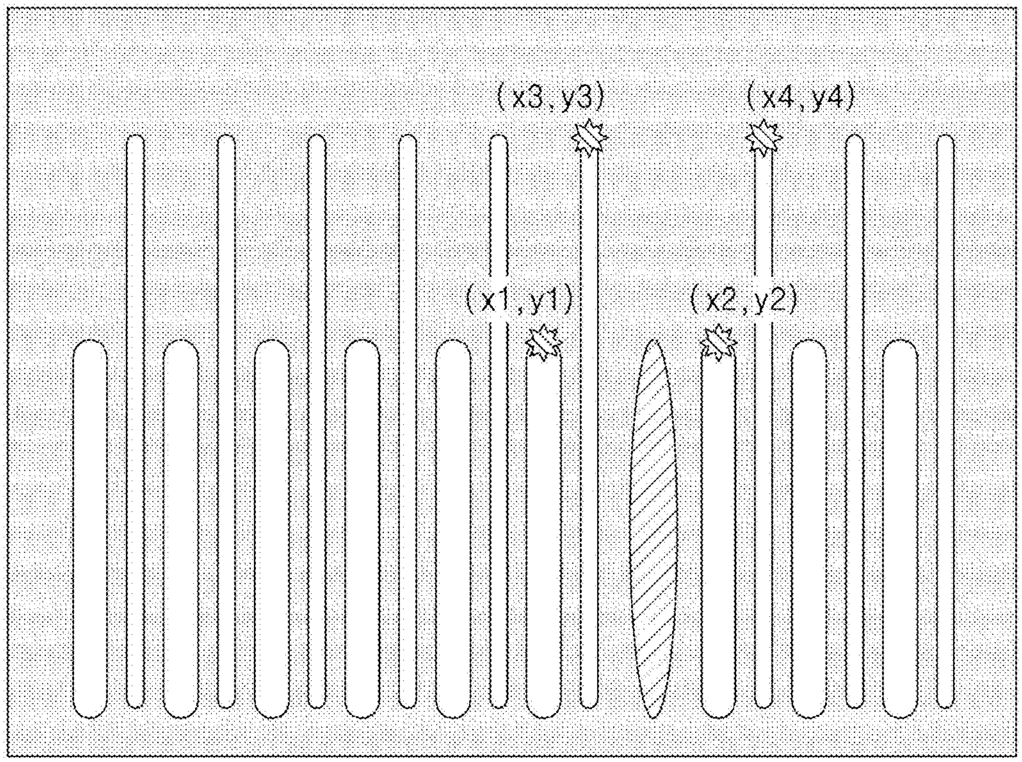

FIG. 4E shows a case where a gap between endpoints of adjacent electrodes is equal to or greater than a reference value due to introduction of a foreign substance (e.g., a tape, a scrap, etc.) between a positive electrode/a negative electrode or folding of a separator, in a structure where the negative electrode and the positive electrode are stacked alternately. For example, the controller 320 may determine that a defect occurs when the following equation is satisfied for end point coordinates (xn, yn) of a positive electrode or a negative electrode. Herein, a reference value $X_{ref}$ may be set at random.

$$|x_{n+1} - x_n| > X_{ref} \quad \text{Equation (2)}$$

Figure 4F:
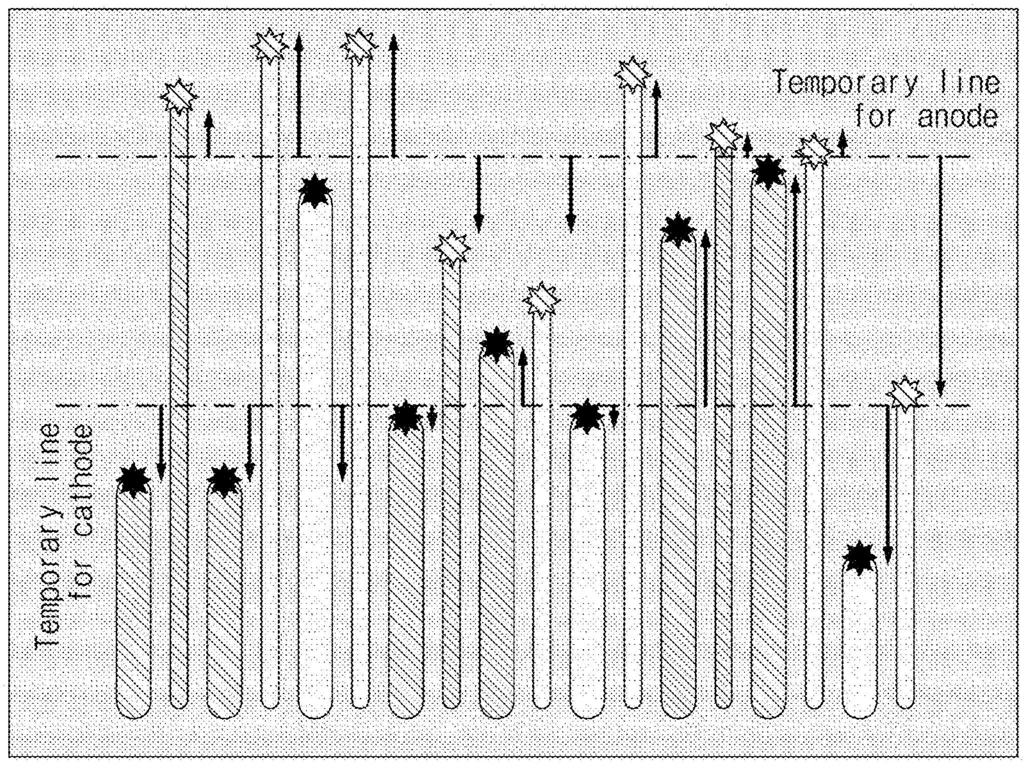

FIG. 4F shows a case where a parameter indicating an alignment state of a positive electrode and a negative electrode in a specific section is less than or equal to a reference value. This is a case where an AC (anode-cathode) overhang does not occur, but high variability occurs due to a poor alignment state of the positive electrode and the negative electrode. In this case, the controller 320 may set temporary lines indicating alignment criteria for a positive electrode and a negative electrode and set a difference from the temporary lines as a parameter for each positive electrode/negative electrode. For example, when the temporary line for a positive electrode or a negative electrode is set as "AVG", the controller 320 may determine that a defect occurs when the following equation is satisfied for end point coordinates ($x_n$, $y_n$) of a positive electrode or a negative electrode. Herein, the reference value $Y_{ref}$ may be set for each positive electrode/negative electrode.

$$|y_n - AVG| > Y_{ref} \quad \text{Equation (3)}$$

Figure 4G:
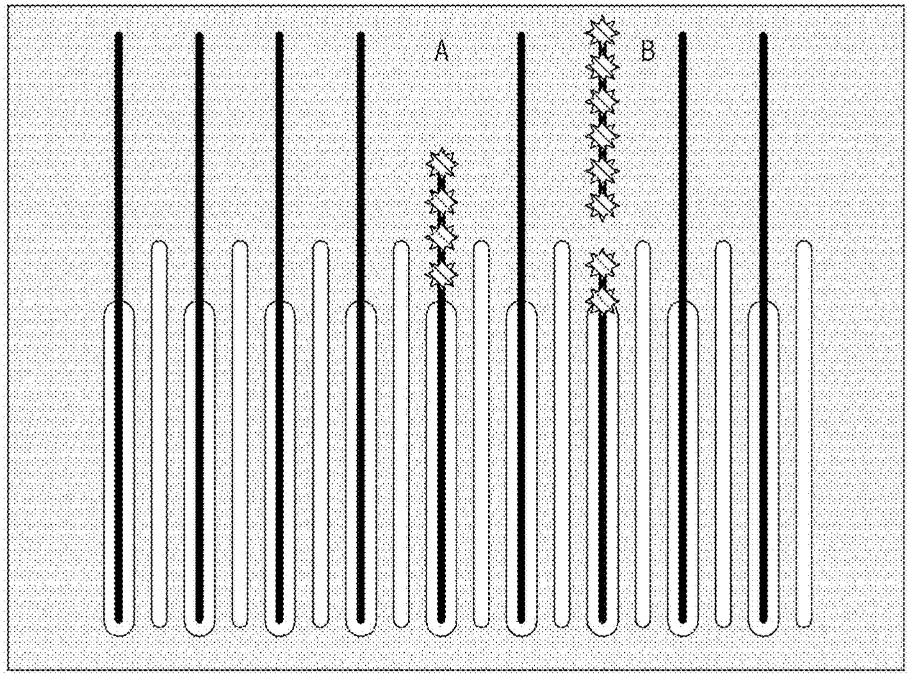

FIG. 4G shows a case where some positive electrode or negative electrode is disconnected. Referring to FIG. 4G, A indicates a case where an electrode is fully disconnected and B indicates an electrode is partially disconnected. The controller 320 determines that an electrode is fully disconnected when an electrode length tracked from an electrode bottom is shorter than that of an adjacent electrode, and determines that an electrode is partially disconnected when tracking is interrupted around a tab. When the tab is disconnected in this way, safety is degraded, determining that a battery cell is defective.

While a description has been made of a case where an electrode defect is determined, with reference to FIGS. 4A to 4G, this is merely an example and various cases for determining a defect based on electrode endpoint coordinates may be added as embodiments.

According to an embodiment, the controller 320 may determine whether an electrode is defective based on a rule-based algorithm together with an artificial intelligence learning model or separately. With the rule-based algorithm, a user determines a defect for an input electrode image according to a predetermined rule. This scheme may automatically determine a defect without a separate machine learning process, but the accuracy thereof may be degraded due to a non-uniform shape of the electrode of the battery cell. Thus, it is desirable to apply the deep learning-based learning model and the rule-based algorithm at the same time to complement each other.

Figure 5:
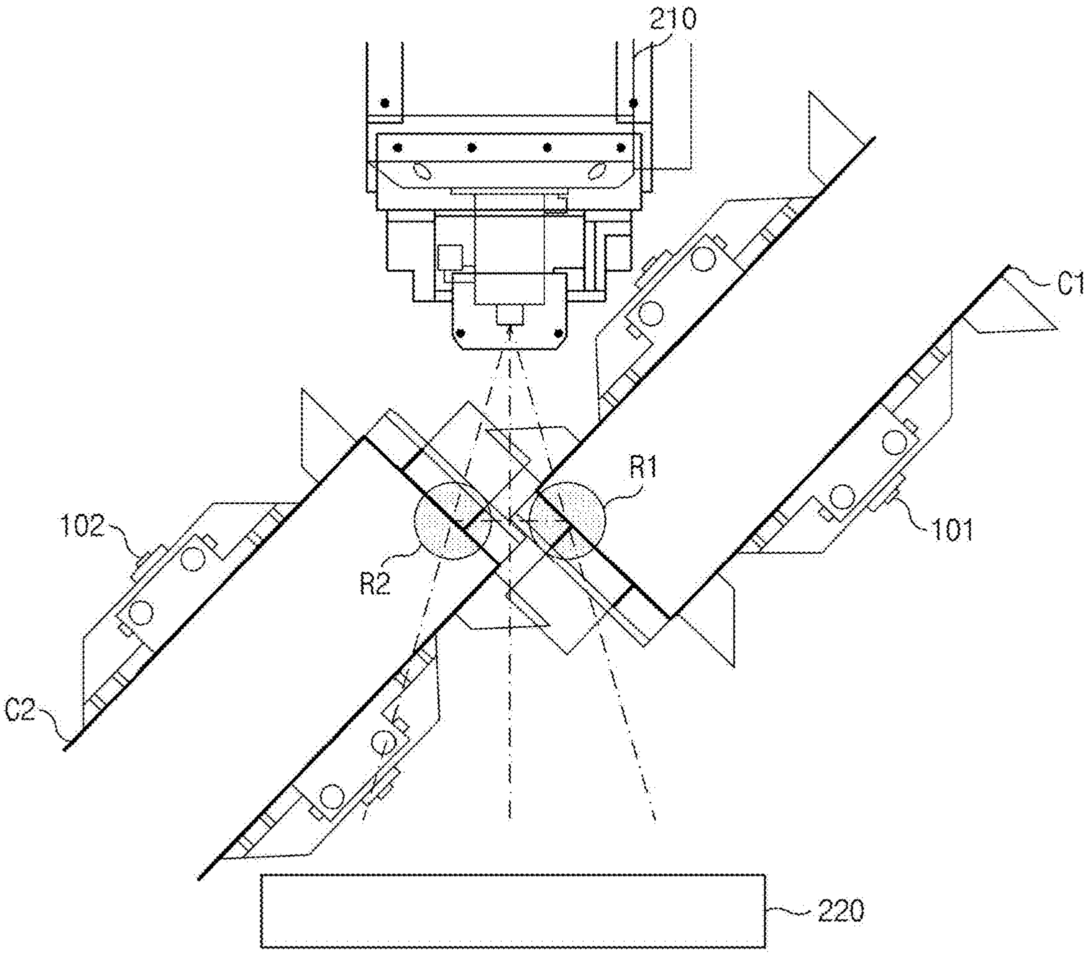
FIG. 5 shows arrangement structures of a tray and a battery cell to simultaneously inspect multiple battery cells.

FIG. 5 shows arrangement structures and a tray and a battery cell to simultaneously inspect multiple battery cells. As shown in FIG. 1, the transferring unit 110 may simultaneously transfer the two or more trays 101 and 102 to the photographing point. The two or more battery cells C1 and C2 may be respectively loaded on the trays 101 and 102.

According to an embodiment, the trays 101 and 102 transferred from the photographing point may be arranged to allow radiation output from the radiation source 210 to penetrate the regions of interest R1 and R2 of the battery cells C1 and C2 loaded on all the trays 101 and 102. For example, as shown in FIG. 5, corners of the battery cells C1 loaded on the tray 101 may face corners of the battery cells C2 loaded on another tray 102. Radiation penetrating the regions of interest R1 and R2 of the battery cells may be detected by the radiation detector 220, and the photographing unit 200 may obtain electrode images for the multiple battery cells C1 and C2 by using the information. As such, by simultaneously inspecting several battery cells, a time required for inspection may be greatly reduced.

Figure 6:
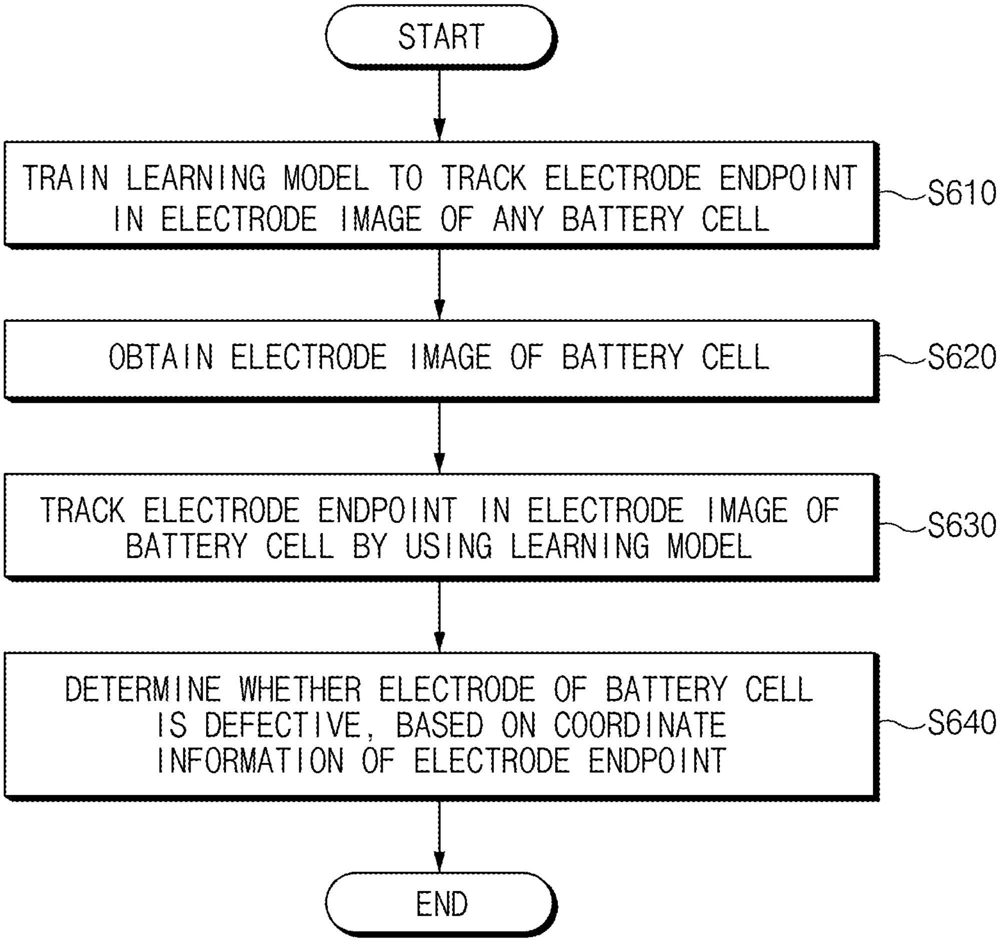
FIG. 6 is a flowchart showing a battery cell inspection method according to an embodiment.

FIG. 6 is a flowchart showing a battery cell inspection method according to an embodiment. Referring to FIG. 6, operation S610 of training a learning model to track an electrode endpoint in an electrode image of a battery cell may be performed. According to an embodiment, the learning model may be generated and trained using a segment labelling scheme. A process of generating and training the learning model is described and thus will not be described in detail. The learning model may be stored in the memory device 310 of the inspection unit 300.

Next, operation S620 of obtaining the electrode image of the battery cell may be performed. Operation S620 may be performed by the photographing unit 200 including the radiation source 210 that outputs radiation (e.g., X rays) toward a region of interest (ROI) of the battery cell and the radiation detector 220 that detects radiation penetrating the region of interest, as shown in FIG. 1. According to an embodiment, operation S620 may include an operation of outputting radiation toward a region of interest of the battery cell by using the radiation source 210 and an operation of detecting radiation penetrating the region of interest of the battery cell by using the radiation detector 220.

Next, operation S630 of tracking an electrode endpoint in the electrode image of the battery cell by using the learning model may be performed. Operation S630 may be performed by the controller 320 included in the inspection unit 300. According to an embodiment, the controller 320 may generate cross-sectional images for two or more directions (e.g., an x-axis direction cross-sectional image and a y-axis direction cross-sectional image) based on the 3D image, and track an electrode endpoint for each cross-sectional image by using a learning model trained based on three-dimensional image data.

Next, operation S640 of determining whether an electrode of the battery cell is defective, based on coordinate information of the electrode endpoint may be performed. Operation S640 may be performed by the controller 320. The electrode of the battery cell may be determined to be defective in at least one of a case where some positive electrode or negative electrode is bent, a case where some positive electrode or negative electrode is missing, a case where a gap between endpoints of adjacent positive electrode and negative electrode is equal to or greater than a reference value, a case where an insertion order of a positive electrode or a negative electrode is reversed, a case where a gap between endpoints of adjacent positive electrodes or a gap between endpoints of adjacent negative electrodes is equal to or greater than a reference value, a case where a parameter indicating an alignment state of a positive electrode and a negative electrode in a specific section is equal to or less than a reference value, and a case where some positive electrode or negative electrode is disconnected (see FIGS. 4A to 4G).

Figure 7:
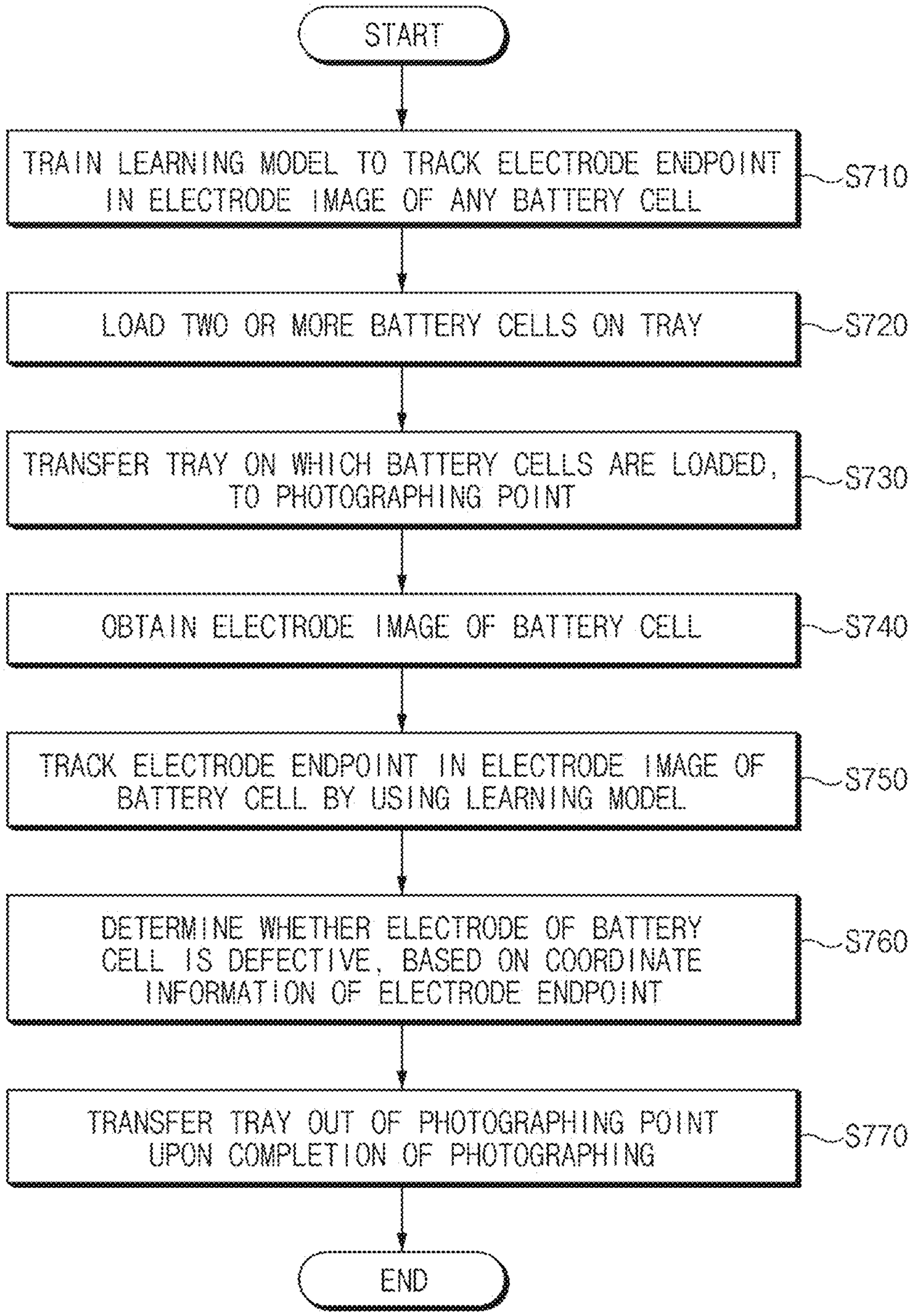
FIG. 7 is a flowchart showing a battery cell inspection method according to another embodiment.

FIG. 7 is a flowchart showing a battery cell inspection method according to another embodiment. Referring to FIG. 7, operation S710 of training a learning model to track an electrode endpoint in an electrode image of a battery cell may be performed. Operation S710 is substantially the same as operation S610 described with reference to FIG. 6, and thus will not be described in detail.

Next, operation S720 of loading two or more battery cells on a tray and operation S730 of transferring the tray on which the battery cells are loaded, to a photographing point, may be performed. As described with reference to FIG. 1, the two or more battery cells C1 and C2 may be respectively loaded on the trays 101 and 102. To inspect corner portions of the several battery cells C1 and C2 at the same time, the battery cells may be loaded exactly on top of each other.

Next, operation S740 of obtaining the electrode image of the battery cell, operation S750 of tracking an electrode endpoint in the electrode image of the battery cell by using the learning model, and operation S760 of determining whether the electrode of the battery cell is defective based on coordinate information of the electrode endpoint may be sequentially performed. Operations S740 to S760 are substantially the same as operations S620 to S640 described with reference to FIG. 6, and thus will not be described in detail.

Upon completion of photographing of the electrode, operation S770 of transferring the tray out of the photographing point may be performed. Operation S770 may be performed at any point in time after operation S740 of obtaining the image of the electrode is finished. Operations S730 and S770 of transferring the battery cell and the tray may be performed by the transferring unit 110 (see FIG. 1).

According to an embodiment, to obtain a three-dimensional image of the battery cell, an operation of rotating, by the transferring unit 110, the tray on which the battery cells are loaded with respect to an axis in the photographing point may be further performed, and in this case, the photographing unit 200 may further perform an operation of obtaining the three-dimensional image of the battery cell based on the two-dimensional radiographic image obtained during rotation of the tray.

At least some operation of the battery cell inspection method according to the embodiments may be implemented in the form of an application or a program instruction that is executable through various computer components and recorded in a computer-readable recording medium. The computer-readable recording medium may include a program instruction, a data file, a data structure and the like solely or in combination.

According to the above-described embodiments of the battery cell inspection system and method, an electrode endpoint may be tracked in a battery cell image by using an artificial intelligence learning model and whether an electrode is defective may be automatically determined based thereon. Moreover, by simultaneously obtaining electrode images of several stacked battery cells and automatically inspecting an electrode of each battery cell by using a learning model, a time required for inspection may be largely reduced. Thus, unlike existing sampling inspection, total inspection may be possible and thus a risk corresponding to a defect of a product may be greatly reduced.

So far, all components constituting the embodiment have been described as being combined or operating in combination, but it is not necessarily limited to this embodiment, and within the scope of the purpose, all components may be selectively combined with one or more to operate. Moreover, terms such as “include”, “constitute”, “have”, etc., described above may mean that the corresponding component may be inherent unless otherwise stated, and thus should be construed as further including other components rather than excluding other components.

The above description is merely illustrative of the technical idea of the present disclosure, and various modifications and variations will be possible without departing from the essential characteristics of embodiments of the present disclosure by those of ordinary skill in the art to which the embodiments disclosed herein pertains.

Therefore, the embodiments disclosed herein are intended for description rather than limitation of the technical spirit of the embodiments disclosed herein and the scope of the technical spirit of the present disclosure is not limited by these embodiments disclosed herein. The protection scope of the technical spirit disclosed herein should be interpreted by the following claims, and all technical spirits within the same range should be understood to be included in the range of the present disclosure.

DESCRIPTION OF THE SYMBOLS

C1, C2: Battery Cells
101, 102: Tray
110: Transferring Unit
200: Photographing Unit
210: Radiation Source
220: Radiation Detector
300: Inspection Unit
310: Memory Device
320: Controller

The invention claimed is:

1. A battery cell inspection system comprising:
a photographing unit configured to obtain an electrode image of a battery cell;
a memory device storing a learning model trained to track an electrode endpoint in the electrode image of the battery cell;
a controller configured to track the electrode endpoint in the electrode image by using the learning model, and to determine whether an electrode of the battery cell is defective based on at least one coordinate point of the electrode endpoint;
a first tray configured to receive a first plurality of battery cells; and
a transferring unit configured to transfer the first tray to a photographing point of the photographing unit and then transfer the first tray out of the photographing point,
wherein the photographing unit comprises:
a radiation source configured to output radiation toward a region of interest of the battery cell; and
a radiation detector configured to detect the radiation that penetrates the region of interest of the battery cell,
wherein the transferring unit is further configured to simultaneously transfer the first tray on which the first plurality of battery cells are loaded and a second tray on which a second plurality of battery cells are loaded, to the photographing point, and
wherein the first and second trays are arranged such that the radiation source is configured to output the radiation, so as to simultaneously penetrate the region of interest of each of the first and second pluralities of battery cells disposed on the respective first and second trays.

2. The battery cell inspection system of claim 1, wherein the learning model is configured to be generated by receiving learning data comprising the electrode image of the battery cell, labelling the learning data, extracting a feature based on the learning data, and recording the feature in a database.

3. The battery cell inspection system of claim 1, wherein the photographing unit is further configured to obtain a three-dimensional image of the region of interest of the battery cell,
the controller is further configured to generate a plurality of cross-sectional images taken from different respective directions based on the three-dimensional image and track the electrode endpoint of the battery cell for each of the plurality of cross-sectional images, and
the learning model is configured to be trained using the plurality of cross-sectional images as learning data.

4. The battery cell inspection system of claim 1, wherein an electrode of the battery cell comprises a plurality of positive electrodes and a plurality of negative electrodes alternately stacked with a respective separator therebetween, and the controller is further configured to determine that the electrode of the battery cell is defective, in at least one of the following cases:
(a) wherein at least one of the plurality of positive electrodes or at least one of the plurality of negative electrodes is bent,
(b) wherein at least one of the plurality of positive electrodes or at least one of the plurality of negative electrodes is missing,
(c) wherein a distance between the respective electrode endpoints of one of the plurality of positive electrodes and an adjacent one of the plurality of negative electrodes is equal to or greater than a first reference value,
(d) wherein an insertion order of at least one of the plurality of positive electrodes or at least one of the plurality of negative electrodes is reversed,
(e) wherein a gap between the respective endpoints of adjacent ones of the plurality of positive electrodes or a gap between the respective endpoints of adjacent ones of the plurality of negative electrodes is equal to or greater than a second reference value,
(f) wherein a parameter indicating an alignment state of one of the plurality of positive electrodes and one of the plurality of negative electrodes is equal to or less than a third reference value, and
(g) wherein at least one of the plurality of positive electrodes or at least one of the plurality of negative electrodes is disconnected.

5. The battery cell inspection system of claim 1, wherein the first and second trays are configured to be arranged the photographing point such that at least one corner of the first plurality of battery cells loaded on the first tray faces at least one corner of the second plurality of battery cells loaded on the second tray.

6. The battery cell inspection system of claim 1, wherein the transferring unit is further configured to rotate the first tray on which the first plurality of battery cells are loaded, with respect to an axis of the photographing point, and
the photographing unit is further configured to obtain a three-dimensional image of each of the first plurality of battery cells based on a two-dimensional radiation image obtained during rotation of the first tray.

7. A battery cell inspection method comprising:
training a learning model to track an electrode endpoint in an electrode image of a battery cell;
obtaining the electrode image of the battery cell;
tracking the electrode endpoint in the electrode image of the battery cell by using the learning model; and
determining whether an electrode of the battery cell is defective based on at least one coordinate point of the electrode endpoint,
loading a first plurality of battery cells on a first tray;
transferring the first tray on which the first plurality of battery cells are loaded, to a photographing point; and
transferring the first tray out of the photographing point,
wherein the obtaining of the electrode image of the battery cell comprises:
outputting radiation toward a region of interest of the battery cell; and detecting the radiation that penetrates the region of interest of the battery cell, wherein the transferring of the first tray to the photographing point comprises simultaneously transferring the first tray on which the first plurality of battery cells are loaded and a second tray on which a second plurality of battery cells are loaded, to the photographing point, and wherein the first and second trays are arranged such that the radiation simultaneously penetrates the region of interest of each of the first and second pluralities of battery cells loaded on the respective first and second trays.

8. The battery cell inspection method of claim 7, wherein the learning model is configured to be generated by receiving learning data comprising the electrode image of the battery cell, labelling the learning data, extracting a feature based on the labelled learning data, and recording the feature in a database.

9. The battery cell inspection method of claim 7, wherein the obtaining of the electrode image of the battery cell comprises obtaining a three-dimensional image for the region of interest of the battery cell, wherein the tracking of the electrode endpoint of the battery cell comprises generating a plurality of cross-sectional images taken from different respective directions based on the three- dimensional image and tracking the electrode endpoint of the battery cell for each of the plurality of cross-sectional images, and wherein the learning model is trained using the plurality of cross-sectional images as learning data.

10. The battery cell inspection method of claim 7, wherein an electrode of the battery cell comprises a plurality of positive electrodes and a plurality of negative electrodes alternately stacked with a respective separator therebetween, and the battery cell inspection method further comprises determining that the electrode of the battery cell is defective, in at least one of the following cases:

(a) wherein at least one of the plurality of positive electrodes or at least one of the plurality of negative electrodes is bent, (b) wherein at least one of the plurality of positive electrodes or at least one of the plurality of negative electrodes is missing, (c) wherein a distance between the respective electrode endpoints of one of the plurality of positive electrodes and an adjacent one of the plurality of negative electrodes is equal to or greater than a first reference value, (d) wherein an insertion order of at least one of the plurality of positive electrodes or at least one of the plurality of negative electrodes is reversed, (e) wherein a gap between the respective endpoints of adjacent ones of the plurality of positive electrodes or a gap between the respective endpoints of adjacent ones of the plurality of negative electrodes is equal to or greater than a second reference value, (f) wherein a parameter indicating an alignment state of one of the plurality of positive electrodes and one of the plurality of negative electrodes is equal to or less than a third reference value, and (g) wherein at least one of the plurality of positive electrodes or the at least one of the plurality of negative electrodes is disconnected.

11. The battery cell inspection method of claim 7, wherein the first and second trays are configured to be arranged at the photographing point such that at least one corner of the first plurality of battery cells loaded on the first tray faces at least one corner of the second plurality of battery cells loaded on the second tray.

12. The battery cell inspection method of claim 7, further comprising rotating the first tray on which the first plurality of battery cells are loaded, with respect to an axis of the photographing point, wherein the obtaining of the electrode image of the battery cell comprises obtaining a three-dimensional image of each of the first plurality of battery cells based on a two-dimensional radiation image obtained during rotation of the first tray.

* * * * *